Figure 1:
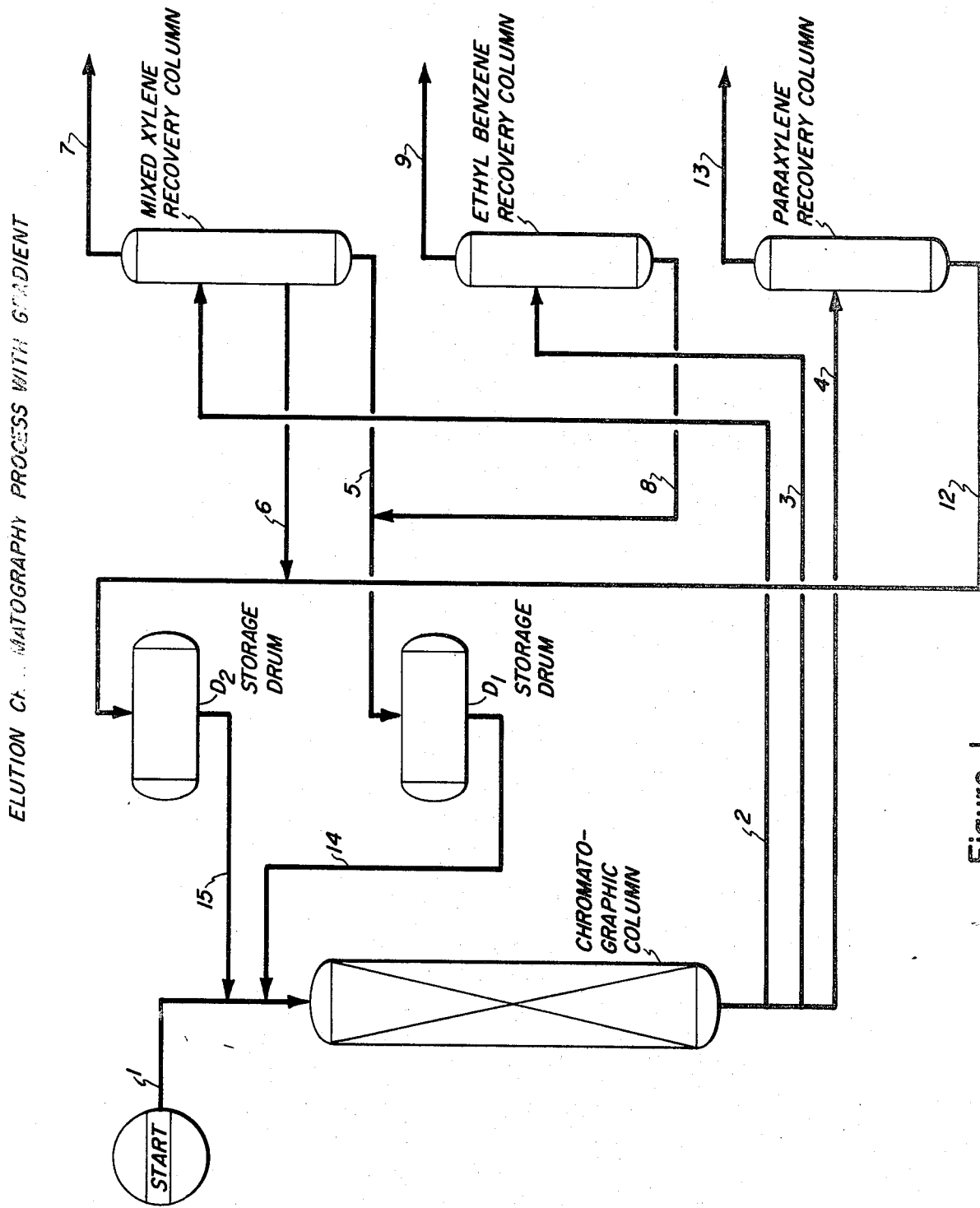

United States Patent [19]  [11] 3,894,108
Geissler  [45] July 8, 1975

[54] HIGH TEMPERATURE LIQUID ELUTION CHROMATOGRAPHY
[75] Inventor: Paul R. Geissler, Edison, N.J.
[73] Assignee: Exxon Research and Engineering Company, Linden, N.J.
[22] Filed: Aug. 9, 1973
[21] Appl. No.: 386,948

[52] U.S. Cl.......... 260/674 SA; 208/310; 210/31 C
[51] Int. Cl.................... C07c 7/12; B01d 15/08
[58] Field of Search.............. 260/674 SA; 208/310; 210/31 C

[56] References Cited
UNITED STATES PATENTS

| | | | |
|---|---|---|---|
| 2,702,826 | 2/1955 | Kirshenbaum et al. | 260/674 |
| 3,686,342 | 8/1972 | Neuzil | 260/674 |
| 3,686,343 | 8/1972 | Bearden et al. | 260/674 |
| 3,699,182 | 10/1972 | Cattanach | 260/674 |
| 3,755,153 | 8/1973 | Rosback | 208/310 |
| 3,770,841 | 11/1973 | Meyers | 260/674 |

Primary Examiner—Delbert E. Gantz
Assistant Examiner—C. E. Spresser, Jr.
Attorney, Agent, or Firm—Frank A. Santoro

[57] ABSTRACT

An elution chromotographic process conducted in the liquid phase for the separation of a component contained in admixture in a feedstream comprising the steps of (a) contacting the feedstream mixture containing the component to be separated with a bed of crystalline alumino-silicate adsorbent at conditions to effect the selective retention of the desired component to be separated by said adsorbent, (b) passing through said bed an eluent selected from thhe group consisting of aromatics and substituted aromatics, (c) recovering from said bed a stream or streams containing at least a portion of the less selectively adsorbed components, and (d) recovering a stream substantially enhanced in concentration of said selectively adsorbed component relative to other components of feedstream. The improved elution chromatography process is particularly applicable to the separation of paraxylene from a C8 aromatic isomer mixture containing ethylbenzene.

10 Claims, 1 Drawing Figure

ELUTION CHROMATOGRAPHY PROCESS WITH GRADIENT 3,894,108

HIGH TEMPERATURE LIQUID ELUTION CHROMATOGRAPHY

FIELD OF THE INVENTION

This invention relates to the operation of commercial elution chromatographic separation processes conducted in the liquid phase, in which one or more components from the mixture are desired to be separated. More particularly, the invention relates to an elution chromatographic separation process carried out in a single column and utilizing preferred sieves, eluents and process conditions. The separation of paraxylene from a C8 aromatic isomer mixture containing additional ethylbenzene is particularly adaptable to the operation of the present invention.

BACKGROUND OF THE INVENTION

In the separation of mixtures into one or more components on a commerical scale, it is economically desirable to employ processes other than fractionation, fractional crystallization and the like. One of the reasons for this is that the cost involved in distilling close boiling components such as C8 aromatic isomers and the like usually exceeds the price at which the pure components can be marketed. The separation of paraxylene from its isomers and ethylbenzene in admixture is currently an important commercial process and methods of obtaining paraxylene at lower costs are desirable.

Chromatography is a process whereby components contained in a fluid mixture may be separated from the mixture. This is accomplished by the selective retardation of one or more of the components of the fluid mixture as the fluid uniformly moves through a column containing a stationary substrate. The retarding results from the distribution of the components of the mixture between the substrate and the bulk fluid as the fluid moves past the stationary phase.

One of the particular chromatographic methods employed is called elution chromatography. In this technique, the feed mixture and carrier fluid and eluent are passed sequentially through the column. In this specification, carrier fluid is taken as liquid materials which are not significantly adsorbed by the substrate in the presence of feed mixture components. Eluent is a term to describe liquid materials which are adsorbed by the substrate and compete for adsorption sites with the feed components. This sequential passage of carrier-eluent and feed leads to a differential migration of the feed's components according to their distribution between two phases. If the components of the sample have different distribution coefficients, a separation of the components is achieved as the components will elute in sequence from the end of the stationary phase. In ordinary elution development, there is a small range of retention volumes or retardation factors for optimum separation. The distribution coefficients must be sufficiently large so that the components eluted early are not pushed off the column as an unresolved series of bands, yet the distribution coefficients must be reasonably small if excessive elution times and some peak broadening are to be avoided. In addition, there must be a difference in the distribution coefficients of the components in order to effect their separation.

In carrying out efficient separations using elution chromatography, it has been difficult to find particular combinations of operating conditions such as eluent and sieve, etc., which provides the effective elution development without the burden of significant peak overlap or high elution volume to feed ratios. However, the present inventioin contributes two optimized process parameters which significantly reduces the cost of separating and recovering paraxylene from C8 aromatic isomer mixtures.

DESCRIPTION OF THE PRIOR ART

It is known in the separation art that certain adsorbents generally comprising crystalline aluminosilicates, i.e. sieves, can be utilized to separate certain hydrocarbons from feed mixtures. In aromatic hydrocarbons separation, in particular the separation of the C8 aromatic hydrocarbons, it is generally recognized that particular sieves are useful for a given C8 aromatic hydrocarbon. Illustrative of the prior art one component processes, is Neuzil, U.S. Pat. No. 3,558,732, which teaches an improved adsorptive separation process, the improvement comprising employing toluene as a desorbent.

Other art workers have taught the use of different kinds of X and Y type sieves for the separation of paraxylene from a mixture of C8 aromatic isomers; see for example, Neuzil U.S. Pat. No. 3,626,020. In U.S. Pat. No. 3,636,121 to Stine et al, a dual adsorption and isomerization process for the recovery and isomerization of various C8 aromatic isomers is described and diethylbenzene is the eluent preferred for operation of the process. In copending application Ser. No. 317,119, a process for the elution chromatographic separation of two or more components was described wherein the preferred sieve was potassium exchanged type Y zeolite and the process was operated at temperatures of preferably about 130°C column operating and temperatures.

SUMMARY OF THE INVENTION

The present invention is primarily concerned with an improved one column elution chromatographic separation process conducted in the liquid phase for the recovery of a single component, i.e. paraxylene, from C8 aromatic mixtures. The process is directed to the ultimate recovery of paraxylene in purities exceeding 99 percent and in which 90 percent of the paraxylene introduced as feed is recovered. The process utilizes various sieves to bring about the desired separations. Representative of the sieves to be hereinafter defined is potassium-Y, i.e., KY sieve. The process is carried out by contacting the feed mixture with a bed containing e.g. the KY sieve, at high temperatures of, for example, about 160°C to 200 degrees C and under conditions to effect the preferential adsorption of paraxylene; contacting the bed of KY sieve containing selectively adsorbed paraxylene with a carrier-eluent mixture to thereby effect the desorption of paraxylene from the bed; recovering from the bed containing said KY sieve, a stream or streams containing metaxylene, orthoxylene, paraxylene, ethylbenzene and mixtures thereof, and ultimately recovering paraxylene as a product stream.

Sieves which are preferred for use in the present process includes potassium-type Y and ammonium/potassium-type Y sieves. The potassium-type Y sieve is a single cation exchanged type Y structured zeolite adequately described in the U.S. Pat. No. 3,696,107, said description herein incorporated by reference. The ammonium/potassium type Y sieve is a co-exchanged type Y structured zeolite which is readily prepared by exchanging a sodium type-Y zeolite with a mixture of ammonium and potassium salts in the manner described in U.S. Pat. No. 3,626,020 and herein incorporated by reference.

Eluents which are preferred for operation of the present invention are metadiisopropylbenzene, i.e., m-DIPB, paradiisopropylbenzene, toluene and the like. The eluting agent in the carrier-eluent stream typically comprises from 10 to 100 percent with the remainder being carrier fluid. Hence, these eluting agents may be used in combination with any inert diluent utilized as a carrier such as an n-dodecane and the like. Typically, it is employed in amounts of about 25 percent m-DIPB and 75 percent n-dodecane.

The present invention is operable over a wide range of pressure conditions which are not critical and the present process may be operated at pressures in the range of from 0.1 to 50 atmospheres, preferably from 0.1 to 10 atmospheres, most preferably from 1 to 5 atmospheres.

Applying the present invention to commercial liquid chromatographic separation of paraxylene from a $C_8$ aromatic isomer mixture, the particular conditions employed such as optimum feed slug size, eluent, length of column, sieve, etc., will vary from case to case.

Additionally, the present process is operable without recycle or with recycle which is defined as the amount of recycle divided by the fresh feed times 100; said recycle will be in the range of from 10 to 100 percent, preferably from about 10 to about 75 percent.

As defined above, the term carrier relates to liquid materials which are not significantly adsorbed by the sieve (substrate) and includes relatively inert materials such as paraffins having from 10 to 20 carbon atoms, preferably from 11 to 15 carbon atoms. Non-limiting representative examples of materials useful as carriers include n-dodecane, n-decane, n-tridecane, n-tetradecane, n-hexadecane, eicosane and the like.

Moreover, while m-DIPB, ODCB and toluene are herein described as preferred eluting agents, the present process is also operable with eluting agents such as are adequately described in copending application Ser. No. 282,983 (OCDB is orthodichlorobenzene), now U.S. Pat. No. 3,843,518.

The optimum concentration of eluting agents in the carrier-eluent mixture is a function of eluting agent type, temperature, sieve type anf feed slug size. Generally, however, the concentrations of eluting agents in the carrier will be in the range of from about 15 to 50 percent by weight. The lower limit of the concentration is defined such that the total elution volume of a particular feed slug is not excessive from an economic standpoint. The maximum eluting agent concentration is defined in a way such that paraxylene overlap with any of the remaining three $C_8$ aromatic isomers is substantially eliminated, thereby providing for the maximum recovery of paraxylene as a pure product stream.

In a typical processing scheme, the process is carried out by utilizing a column containing e.g. a KY sieve through which is passed a carrier-eluent composed of 20 percent m-DIPB-80 percent n-dodecane, at a linear velocity of 0.3 feet/minute, and a column temperature of 160°C. Carrier-eluent flow is stopped after the column has been sufficiently purged and a feed slug composed of 20 percent p-xylene, 20 percent o-xylene, 20 percent ethylbenzene and 40 percent m-xylene is injected into the column. After feed slug injection, carrier-eluent flow is immediately resumed; the chromatogram development is thereafter effected and component separation occurs because of the differential adsorption of the feed components by the sieve as the feed is carried along the sieve bed by the carrier-eluent flow. It is seen that by operation of the present process, it is possible to obtain the recovery of paraxylene at lower overall costs from the feedstream, because of this elution development that occurs in the sieve as the feed slug is being moved through the bed by the carrier-eluent and operation of the process at the prescribed temperatures and feed slug sizes decreases elution volume to feed ratio by up to 40 percent.

The present invention will be more easily understood by reference to FIG. 1.

In FIG. 1, representing a typical commercial-scale application of the invention, the feed slug, stream 1, is introduced into a chromatographic column. The feed slug is followed by carrier-eluent stream 14. Product recovery is achieved by directing the eluted streams to separate fractionation facilities. Stream 2 (first cut) is fractionated into a mixed xylene product (Stream 7) and a desorbent bottoms (Stream 5). Stream 3 (second cut) is fractionated into ethylbenzene product (Stream 9) and a desorbent bottoms (Stream 8). Stream 4 is fractionated into paraxylene product (Stream 13) and a desorbent bottoms (Stream 12). The desorbent streams (Streams 5, 8 and 12) are sent to storage drums for reuse. For the fractionation scheme shown, both the carrier and the eluent must have higher boiling points than the products. If increased paraxylene recovery is desired, an additional product is taken (Stream 17), which contains ethylbenzene admixed with paraxylene and is recycled to the column with fresh feed.

To further illustrate the improved process of the present invention, the following examples are provided; however, it is to be understood that the details thereof are not to be regarded as limitations, as they may be varied as will be understood by one skilled in the art.

EXAMPLE 1

Potassium Y sieve was ground to 20–40 mesh and about 30 grams were loaded into a 9 foot long, 0.25 inch O.D., 0.18 inch I.D. stainless steel column. A carrier-eluent mixture of 25 percent m-DIPB and 75 percent paraffin was fed through the column at 130°C and at a constant flow rate of 1.5 cc per minute. The carrier-eluent flow was stopped and a 2.0 cc sample of 20 percent paraxylene, 20 percent ethylbenzene, 20 percent orthoxylene and 40 percent methaxylene was injected into the system upstream of the packed column through a sixport sample loop valve. Carrier-eluent flow was restarted immediately and samples of the stream eluting from the end of the column were taken periodically. Each sample was analyzed for the weight percentage of the $C_8$ aromatics by gas chromatography. The results showed that 21 percent of the ethylbenzene injected was recovered as pure product (free of other $C_8$ isomers) and that the elution volume (based on 95 percent paraxylene recovery) to feed ratio was 64.

EXAMPLE 2

The procedure of Example 1 was repeated except that 2.5 cc of the same aromatic mixture was injected. The results show that 16 percent of the ethylbenzene injected was recovered as a pure product and that the elution volume to feed ratio was 54.

EXAMPLE 3

The procedure of Example 1 was repeated except that a column temperature of 160°C was used. The results show that 11 percent of the ethylbenzene injected was recovered as a pure product and that the elution volume to feed ratio was 46.

EXAMPLE 4

The procedure of Example 2 was repeated except that a temperature of 160°C was used. The results show that less than 5% of the ethylbenzene injected was recovered as a pure product and that the elution volume to feed ratio was 37.

Table I summarizes the effects of feed slug size and temperature on the elution volume to feed ratio and the amount of ethylbenzene recovered.

TABLE I

| cc | E/F[1] — % Ethylbenzene Recovered | |
|---|---|---|
| °C | 2.0 cc | 2.5 cc |
| 130 | 64 – 21 | 54 – 16 |
| 160 | 46 – 11 | 40 – 4 |

[1] E/F is $\dfrac{\text{Elution Volume}}{\text{Feed}}$

EXAMPLE 5

The procedure of Example 1 was repeated except that ammonium/potassium-type Y sieve was used. The results show that no ethylbenzene was recovered as pure product and that the elution volume to feed ratio was 65. In Examples 1–4, there was only very slight overlap of the ethylbenzene-paraxylene peaks (less than 5 percent of the paraxylene mixed with the ethylbenzene) while in this Example 5, the amount of paraxylene that overlapped with ethylbenzene was greater than 15 percent.

EXAMPLE 6

The procedure of Example 2 is repeated except that a mixture of 20 percent m-DIPB - 5 percent paradiisopropylbenzene - 75 percent paraffin is used as the carrier-eluent. Substantially the same results as found in Example 2 are reproduced.

EXAMPLE 7

The procedure of Example 4 is repeated except that a mixture of 20 percent m-DIPB - 5 percent paradiisopropylbenzene - 75 percent paraffin is used as the carrier-eluent. Substantially the same results as found in Example 4 are reproduced.

In each of Examples 1–7 above inclusive, paraxylene recovery exceeded 90 percent of paraxylene introduced as feed.

What is claimed is:

1. In an elution chromatographic process conducted in a liquid phase for the separation of paraxylene and ethylbenzene from a $C_8$ aromatic feedstream containing ethylbenzene including the steps of:
    a. contacting the feedstream mixture with a crystalline aluminosilicate adsorbent selected from the group consisting of potassium Y sieve and ammonium/potassium Y sieve;
    b. passing through said bed an eluent selected from the group consisting of aromatics and substituted aromatics;
    c. recovering from said bed a stream containing a portion of less preferentially adsorbed components; and
    d. recovering a stream or streams substantially enhanced in concentration of paraxylene and ethylbenzene wherein the improvement comprises operating the above-described process at a temperature in the range from 160°C to 200°C, thereby reducing the overall elution volume to feed ratio and providing for the recovery of paraxylene and ethylbenzene at a reduced cost.

2. The process of claim 1 wherein said eluent is one selected from the group consisting of metadiisopropylbenzene, paradiisopropylbenzene and toluene.

3. The process of claim 1 wherein a mixture of metadiisopropylbenzene and paradiisopropylbenzene are employed as the eluent.

4. The process of claim 1 wherein the amount of ethylbenzene recovered as pure products is less than 5 percent based upon the amount of feed.

5. The process of claim 1 wherein said feedstream injected into the column is in an amount in excess of the amount employed during operation of the process at temperatures less than 160°C.

6. In an elution chromatographic process conducted in the liquid phase for the separation of paraxylene and ethylbenzene from a $C_8$ aromatic feedstream containing ethylbenzene including the steps of:
    a. contacting the feedstream mixture with a bed containing a potassium Y sieve;
    b. passing through said bed an eluent selected from the group consisting of m-diisopropylbenzene, toluene and p-diisopropylbenzene;
    c. recovering from said bed a stream containing a portion of less preferentially adsorbed components; and
    d. recovering a stream or streams substantially enhanced in concentration of paraxylene and ethylbenzene wherein the improvement comprises operating the described process at a temperature in the range from about 160°C to 200°C thereby reducing the overall elution volume to feed ratio and providng for the recovery of paraxylene and ethylbenzene at a reduced cost.

7. The process of claim 6 wherein a mixture of metadiisopropylbenzene and paradiisopropylbenzene are employed as the eluent.

8. The process of claim 6 wherein the amount of ethylbenzene recovered as pure product is less than 5 percent based upon the amount of feed.

9. The process of claim 6 wherein said feedstream is injected into the column containing the bed of Ky sieve in an amount in excess of the amount employed during operation of the process at temperatures less than 160°C.

10. The process of claim 6 wherein said less preferentially adsorbed components are selected from the group consisting of m-xylene, o-xylene and mixtures thereof.

* * * * *